(12) United States Patent
Krishnan et al.

(10) Patent No.: US 10,218,017 B2
(45) Date of Patent: Feb. 26, 2019

(54) WATER MANAGEMENT SYSTEM IN ELECTROCHEMICAL CELLS WITH VAPOR RETURN COMPRISING AIR ELECTRODES

(71) Applicant: NANTENERGY, INC., Scottsdale, AZ (US)

(72) Inventors: Ramkumar Krishnan, Scottsdale, AZ (US); Joel Hayes, Chandler, AZ (US); Grant Friesen, Fountain Hills, AZ (US); Shawn Fink, Mesa, AZ (US)

(73) Assignee: NANTENERGY, INC., Scottsdale, AZ (US)

( * ) Notice: Subject to any disclaimer, the term of this patent is extended or adjusted under 35 U.S.C. 154(b) by 329 days.

(21) Appl. No.: 15/077,341

(22) Filed: Mar. 22, 2016

(65) Prior Publication Data

US 2016/0293978 A1    Oct. 6, 2016

Related U.S. Application Data

(60) Provisional application No. 62/140,257, filed on Mar. 30, 2015.

(51) Int. Cl.
*C25B 15/08* (2006.01)
*H01M 10/42* (2006.01)
(Continued)

(52) U.S. Cl.
CPC .......... *H01M 8/0485* (2013.01); *C25B 15/08* (2013.01); *H01M 8/04126* (2013.01);
(Continued)

(58) Field of Classification Search
CPC .......... H01M 8/0485; H01M 8/04126; H01M 8/04171; H01M 12/08; H01M 10/42
(Continued)

(56) References Cited

U.S. PATENT DOCUMENTS

| 8,168,337 B2 | 5/2012 | Friesen et al. |
| 8,309,259 B2 | 11/2012 | Friesen et al. |

(Continued)

OTHER PUBLICATIONS

Written Opinion of the International Preliminary Examining Authority dated Feb. 24, 2017 for Appln. No. PCT/US2016/023564.
(Continued)

*Primary Examiner* — Sean P Cullen
(74) *Attorney, Agent, or Firm* — Pillsbury Winthrop Shaw Pittman, LLP

(57) ABSTRACT

A system and methods for managing water content in one or more electrochemical cell is disclosed. The system includes a gas-phase conduit for receiving humid gas-phase associated with the electrochemical cell, a desiccator unit connected to each electrochemical cell and configured for extracting water from the humid gas-phase, a heater for selectively heating the desiccator unit, and a carbon dioxide (CO2) scrubber connected to the desiccator unit. The system may capture water vapor at the desiccator unit from a humid gas-phase exiting electrochemical cell, or release water vapor in desiccator unit, via actuation of heater, that is transported into the electrochemical cell depending on the mode of operation. The CO2 scrubber may also be used to capture water vapor, based on the mode of operation.

35 Claims, 4 Drawing Sheets

(51) Int. Cl.
   *H01M 12/08* (2006.01)
   *H01M 8/04119* (2016.01)
   *H01M 8/04828* (2016.01)

(52) U.S. Cl.
   CPC ....... *H01M 8/04171* (2013.01); *H01M 10/42* (2013.01); *H01M 12/08* (2013.01); *Y02E 60/128* (2013.01)

(58) Field of Classification Search
   USPC ........................................ 429/403, 407, 413
   See application file for complete search history.

(56) References Cited

U.S. PATENT DOCUMENTS

| | | | |
|---|---|---|---|
| 8,491,763 | B2 | 7/2013 | Friesen |
| 8,492,052 | B2 | 7/2013 | Friesen et al. |
| 8,659,268 | B2 | 2/2014 | Krishnan et al. |
| 8,877,391 | B2 | 11/2014 | Friesen et al. |
| 8,895,197 | B2 | 11/2014 | Friesen et al. |
| 8,906,563 | B2 | 12/2014 | Friesen et al. |
| 8,911,910 | B2 | 12/2014 | Krishnan et al. |
| 9,105,910 | B2 | 8/2015 | Friesen et al. |
| 9,105,946 | B2 | 8/2015 | Friesen et al. |
| 9,178,207 | B2 | 11/2015 | Friesen et al. |
| 9,214,708 | B2 | 12/2015 | Friesen et al. |
| 9,269,995 | B2 | 2/2016 | Friesen et al. |
| 9,269,996 | B2 | 2/2016 | Friesen et al. |
| 2009/0239132 | A1 | 9/2009 | Johnson |
| 2010/0316935 | A1 | 12/2010 | Friesen et al. |
| 2011/0070506 | A1 | 3/2011 | Friesen et al. |
| 2011/0250512 | A1 | 10/2011 | Friesen et al. |
| 2012/0237838 | A1* | 9/2012 | Uesaka ................. H01M 12/06 429/405 |
| 2012/0321969 | A1 | 12/2012 | Friesen et al. |
| 2013/0106359 | A1 | 5/2013 | Noda et al. |
| 2013/0115523 | A1 | 5/2013 | Friesen et al. |
| 2013/0115525 | A1 | 5/2013 | Friesen et al. |
| 2014/0227615 | A1 | 8/2014 | Friesen et al. |

OTHER PUBLICATIONS

International Search Report and Written Opinion dated Jun. 16, 2016 for Appln. No. PCT/US2016/023564.
International Preliminary Report on Patentability PCT/US2016/023564 dated May 30, 2017.

\* cited by examiner

WATER MANAGEMENT SYSTEM IN ELECTROCHEMICAL CELLS WITH VAPOR RETURN COMPRISING AIR ELECTRODES

CROSS REFERENCE TO RELATED APPLICATION

This patent application claims priority to provisional patent application 62/140,257 filed on Mar. 30, 2015, and is incorporated by reference herein in its entirety.

FIELD

The present invention is generally related to electrochemical cells, and more particularly to electrochemical cells comprising air breathing cathodes and utilizing a liquid ionically conductive medium.

BACKGROUND

Many types of electrochemical cells utilize a liquid ionically conductive medium to support electrochemical reactions within the cell. Electrochemical cells may utilize an air breathing electrode coupled to a fuel electrode, comprising any suitable fuel. For example, a metal-air electrochemical cell system may comprise a plurality of cells, each having a fuel electrode serving as an anode at which metal fuel is oxidized, and an air breathing oxidant reduction electrode at which oxygen from ambient air is reduced. The liquid ionically conductive medium in such cells may communicate the oxidized/reduced ions between the electrodes.

In various ionically conductive mediums, evaporation, electrolysis (e.g. water splitting on recharge) or other loss of moisture from the ionically conductive medium, may be detrimental to the electrochemical cell particularly for cells requiring water to operate. For example, salting of the ionically conductive medium may clog an oxidant electrode of the electrochemical cell, reducing its performance or in extreme cases, result in complete cell failure. Such salting or other failures may occur, for example, where an air-side of the oxidant electrode, or a portion thereof, is excessively dry. Additionally, a decrease in water content in the ionically conductive medium may decrease the medium's solvating capacity, i.e., its ability to dissolve solutes, or increase the percentage concentration of solutes in the medium.

Systems have been developed for managing electrochemical cells. U.S. Patent Publication No. 20140227615, filed Feb. 10, 2014 and from the same Applicant, provides an example of a battery water management system, which is hereby incorporated by reference in its entirely.

This disclosure provides for a water management system to maintain water content in any electrochemical cell comprising a liquid ionically conductive medium without the need for pumps, liquid water reservoirs and mechanical level-control valves.

SUMMARY

In one aspect of this disclosure, there is provided a system for managing water content in one or more electrochemical cell. Each electrochemical cell has a plurality of electrodes and a liquid ionically conductive medium. The system includes: a gas-phase conduit for receiving humid gas-phase associated with the electrochemical cell; a desiccator unit connected to each electrochemical cell and configured for extracting water from the humid gas-phase; a heater for selectively heating the desiccator unit to selectively release extracted water from the desiccator unit; and a carbon dioxide scrubber connected to the desiccator unit configured to absorb carbon dioxide, wherein, during a water capture mode, the system is configured to capture water vapor at the desiccator unit from a humid gas-phase exiting electrochemical cell. During a cell humidification mode, the system is configured to release water vapor in desiccator unit, via actuation of heater, to produce a humid gas-phase that is transported into the electrochemical cell.

Another aspect of this disclosure provides a method for managing water content in one or more electrochemical cells. Each of the cells has a plurality of electrodes and a liquid ionically conductive medium. The method includes: receiving humid air from the one or more electrochemical cells in a desiccator unit; selectively heating the desiccator unit using a heater; absorbing carbon dioxide from the humid air using a carbon dioxide scrubber connected to the desiccator unit; and directing the humid air from the carbon dioxide scrubber to the ionically conductive medium.

Yet another aspect of the disclosure provides a method for managing water content in a system comprising one or more electrochemical cells. Each of the cells has a plurality of electrodes and a liquid ionically conductive medium. The system also has a carbon dioxide scrubber. The method includes: inputting air from an outside, atmospheric source to the carbon dioxide scrubber; absorbing carbon dioxide from the outside, atmospheric air using the carbon dioxide scrubber; directing output air from the carbon dioxide scrubber to the ionically conductive medium of the one or more electrochemical cells; and receiving humid air from the one or more electrochemical cells in a desiccator unit. The desiccator unit and the carbon dioxide scrubber are configured to be selectively communicatively coupled.

Other aspects of the present invention will become apparent from the following detailed description, the accompanying drawings, and the appended claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

This disclosure endeavors to facilitate maintaining desired water content in the electrochemical cell, in addition to controlling humidity associated with an air breathing electrode thereof. More particularly, the present application discloses a system and method for maintain water content of electrochemical cells through an air-breathing electrode.

The battery water management system described in detail below is according to an embodiment wherein the electrochemical cell comprises an air-breathing oxidant electrode. According to such an embodiment, the water management system provides both functions of maintaining water content in the electrochemical cell and controlling humidity associated with the air-breathing electrode.

Figure 1:
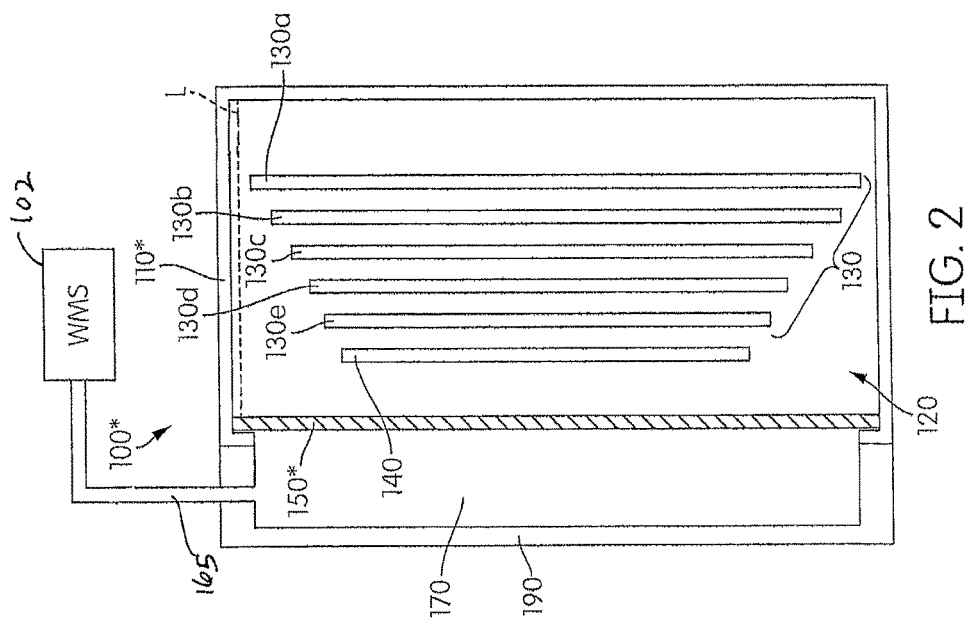
FIG. 1 schematically illustrates an embodiment of an electrochemical cell having an immersed oxidant reduction electrode configured to be coupled to a water management system.

FIG. 1 illustrates a schematic cross sectional view of an embodiment of an electrochemical cell 100. As shown, the components of the electrochemical cell 100 may be contained at least partially in an associated housing 110. The cell 100 utilizes a liquid ionically conductive medium that is contained within the housing 110, and is configured to circulate therein to conduct ions within the cell 100. While at times the ionically conductive medium may be generally stationary within the housing 110, such as in a stagnant zone or other quantity of ionically conductive medium, it may be appreciated that the cell 100 may be configured to create a convective flow of the ionically conductive medium. In some embodiments, such a flow may be generated through controlled direction of bubbles generated through electrochemical processes within the cell, through a sparger, or through any other bubble generating process. In some embodiments, the flow may be generated through any other flow generator, including but not limited to a pump. In some embodiments, localized heating causes convection of the liquid.

Various portions of the electrochemical cell 100 may be of any suitable structure or composition, including but not limited to being formed from plastic, metal, resin, or combinations thereof. Accordingly the cell 100 may be assembled in any manner, including being formed from a plurality of elements, being integrally molded, or so on. In various embodiments the cell 100 and/or the housing 110 may include elements or arrangements from one or more of U.S. Pat. Nos. 8,168,337, 8,309,259, 8,491,763, 8,492,052, 8,659,268, 8,877,391, 8,895,197, 8,906,563, 8,911,910, 9,105,910; 9,105,946; 9,178,207; 9,214,708; 9,269,995; 9,269,996 and U.S. Patent Application Publication Nos, 20100316935, 20110070506, 20110250512, 20120321969, 20130115523, and 20130115525, each of which are incorporated herein in their entireties by reference.

While the electrochemical cell 100 may vary across embodiments, the illustrated embodiment of FIG. 1 schematically depicts in cross section a cell chamber 120 within the housing 110. The ionically conductive medium may generally be massed within the cell chamber 120, however may flow within the cell chamber 120, or may flow through the cell chamber 120 (e.g., from one electrochemical cell 100 to another electrochemical cell 100, or from a reservoir to and from the electrochemical cell 100). A fuel electrode 130 of the cell 100 may be supported in the cell chamber 120 so as to be contacted by the ionically conductive medium. In an embodiment, the fuel electrode 130 is a metal fuel electrode that functions as an anode when the cell 100 operates in discharge (i.e., electricity generating) mode, as discussed in further detail below. As shown, in some embodiments the fuel electrode 130 may comprise a plurality of permeable electrode bodies 130a-130e. Although in the illustrated embodiment five permeable electrode bodies 130a-130e are used, in other embodiments any number is possible. Each permeable electrode body 130a-130e may include a screen that is made of any formation that is able to capture and retain, through electrodeposition, or otherwise, particles or ions of metal fuel from the ionically conductive medium that flows through or is otherwise present within the cell chamber 120. In an embodiment, electrode body 130a may be a terminal electrode body, configured such that when charging, metal fuel may generally grow on the electrode bodies 130a-e in a direction defined from electrode body 130a towards electrode body 130e. Although in the illustrated embodiment, the permeable electrode bodies 130a-130e may have different sizes so that a stepped scaffold configuration may be used, as described by U.S. Pat. No. 8,659,268, and incorporated by reference above, in other embodiments the permeable electrode bodies 130a-130e may have substantially the same size.

In some embodiments, a plurality of spacers may separate the permeable electrode bodies 130a-130e so as to create flow lanes in the fuel electrode 130. Although in some embodiments the plurality of spacers may be connected to the housing 110 so that the fuel electrode 130 may be held in place relative to the housing 110, in other embodiments the spacers may be molded in between the permeable electrode bodies 130a-130e, and potentially between the fuel electrode 130 and the charging electrode 140, such that the permeable electrode bodies 130a-e (and potentially the charging electrode 140) are part of a combined electrode module. Such a configuration is depicted in U.S. Pat. No. 8,492,052, incorporated by reference in its entirety above. In various embodiments, the spacers may be non-conductive and electrochemically inert so they are inactive with regard to the electrochemical reactions in the cell 100. In some embodiments, the spacers may be made from a suitable plastic material, such as polypropylene, polyethylene, polyester, noryl, ABS, fluoropolymer, epoxy, or so on. The flow lanes in the fuel electrode 130 may be three-dimensional, and have a height that is substantially equal to the height of the spacers. Although generally the spacers would be oriented vertically so as to create flow lanes that are parallel to the charging electrode generating the bubbles, in other embodiments, such as but not limited to where the top of the fuel electrode 130 is blocked, as described below, the spacers may be oriented so as to create flow lanes oriented through the permeable electrode bodies 130a-e. It should be appreciated, however, that the spacers and/or flow lanes are optional, and may be omitted in some embodiments.

In some embodiments of the cell 100, such as that illustrated, a charging electrode 140 may be positioned spaced from the fuel electrode 130, distal from the terminal electrode body 130a (i.e. proximal to the electrode body 130e). In some embodiments, the charging electrode 140 may be a portion of the fuel electrode 130 (including, for example, being one or more of the permeable electrode bodies 130b-130e). As with the fuel electrode 130, the charging electrode 140 may be positioned within the cell chamber 120, so as to be in contact with the ionically conductive medium. In the illustrated embodiment, the charging electrode 140 is in a stepped configuration similar to the permeable electrode bodies 130a-e. In other embodiments, however, the charging electrode 140 may extend at least as far as the longest of the permeable electrode bodies 130a-e, when those electrode bodies 130a-e are in a stepped scaffold configuration, or otherwise vary in size. As described in greater detail below, the charging electrode 140 may be configured to participate in the oxidation of an oxidizable oxidant species, which is present in the liquid ionically conductive medium, so as to promote the reduction of an oxidized metal fuel species and growth of the metal fuel on the fuel electrode 130 during charging of the cell 100. Accordingly, in some embodiments, the charging electrode 140 may be characterized as an oxygen evolving electrode, due to the bubbling off of oxygen gas from the charging electrode 140 during the charging of the electrochemical cell 100, as described in greater detail below.

Further shown in FIG. 1 is an oxidant reduction electrode 150, which is spaced from the fuel electrode 130 and the charging electrode 140, distal from the terminal electrode body 130a. As shown, the oxidant reduction electrode 150 may be sealed or otherwise assembled into an oxidant reduction electrode module 160 that is immersed into the ionically conductive medium 145 in the cell chamber 120. Communication channels, represented by 165, extend into the oxidant reduction electrode module 160, so as to provide air or another other oxidant to an air space 170 that is formed between a housing of the oxidant reduction electrode module 160 and the oxidant reduction electrode 150 and to provide an outlet. It may be appreciated that the air or other oxidant in the air space 170 supplies oxidant to the oxidant reduction electrode 150. Accordingly, the oxidant reduction electrode 150 has one surface facing the ionically conductive medium 145 and an opposite surface facing a gaseous oxidant receiving space 170. Additional details of such a configuration are described in U.S. Publication No. 20130115523, entitled "Immersible Gaseous Oxidant Cathode for Electrochemical Cell System," and incorporated by reference in its entirety above. It may be appreciated that the communication channels 165 may include a tubular or similar configuration, which may facilitate supplying oxidant to the oxidant reduction electrode 150 while allowing ionically conductive medium to pass over the oxidant reduction electrode module 160 (e.g., to either side of the channels 165).

Figure 3:
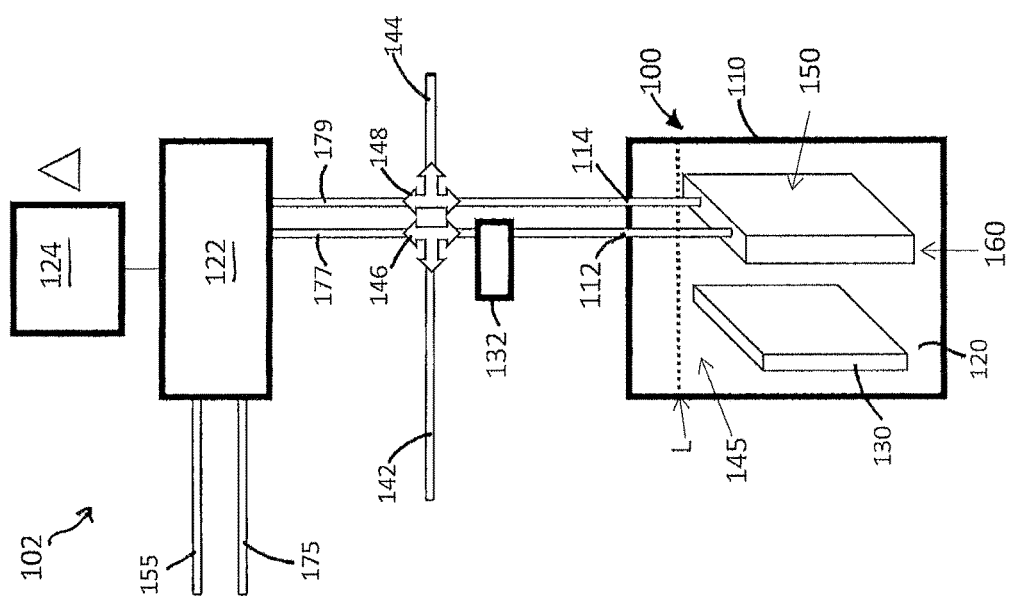
FIG. 3 is a diagram of an embodiment of a water management system which may be coupled to an electrochemical cell such as those illustrated in FIGS. 1 and 2.
Figure 4:
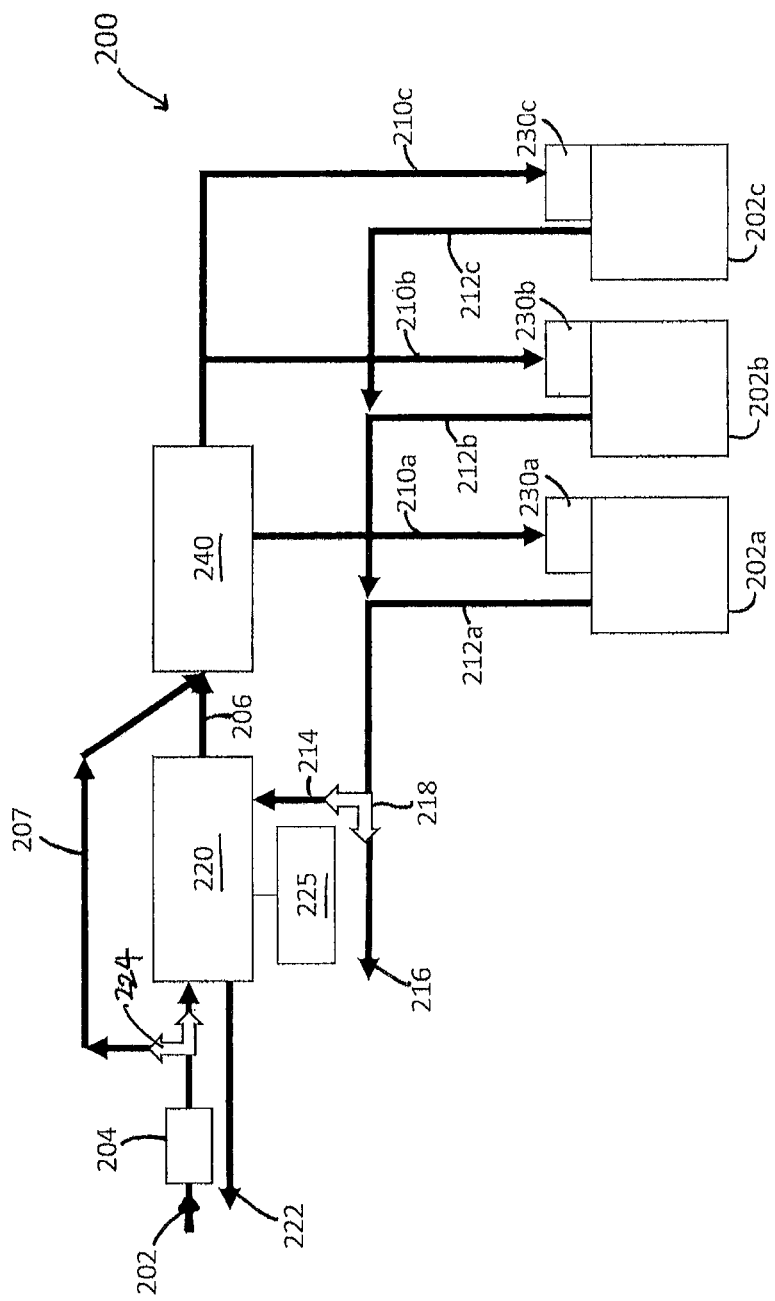
FIG. 4 is a diagram of an embodiment of a water management system including a plurality of electrochemical cells with desiccator unit and CO2 Scrubber connected in series.
Figure 5:
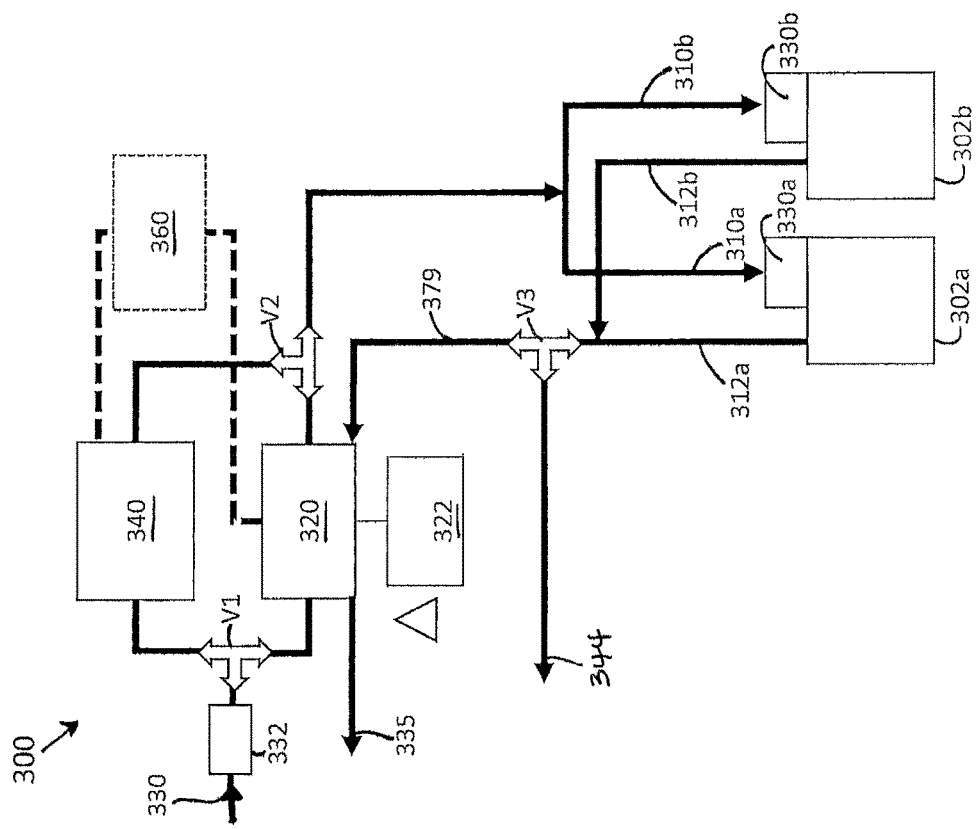
FIG. 5 is a diagram of an embodiment of a water management system including a plurality of electrochemical cells with desiccator unit and CO2 Scrubber connected in parallel.

Although not illustrated in FIG. 1, in some embodiments, such as shown in FIGS. 3-5, the communication channels 165 may include a separate air channel inlet and air channel outlet extending into and out of the air space 170 respectively, allowing for the channels 165 to form part of an air flow path through the air space 170. The air flow path is described in greater detail below. While the air inlet and air outlet may share a common housing extending through the ionically conductive medium into the oxidant reduction electrode module 160 in some embodiments, in other embodiments the communication channels 165 may include a pair of spaced air paths extending through the ionically conductive medium into the oxidant reduction electrode module 160.

As shown, in embodiments containing the separate charging electrode 140, the separate charging electrode 140 may be positioned between the oxidant reduction electrode 150 and the fuel electrode 130. In embodiments of the cell 100 lacking the separate charging electrode 140, the oxidant reduction electrode 150 may be utilized both during charging and discharging of the cell 100 (i.e. as an anode during charging and as a cathode during discharging).

Components of the cell 100, including for example, the fuel electrode 130, the permeable electrode bodies 130a-e thereof, the separate charging electrode 140, and the oxidant reduction electrode 150 may be of any suitable construction or configuration, including, for example, being constructed from one or more of Nickel or Nickel alloys (including Nickel-Cobalt, Nickel-Iron, Nickel-Copper (i.e. Monel), or superalloys), Copper or Copper alloys, brass, bronze, carbon, platinum, silver, silver-palladium, or any other suitable metal or alloy. In some embodiments, one or more components of the cell 100, such as the fuel electrode 130, the separate charging electrode 140, and the oxidant reduction electrode 150, may comprise a highly conductive material that is plated with a more degradation resistant material. For example, in some embodiments the one or more components of the cell may comprise copper that is plated with nickel, tin, silver, gold, or any other chemically compatible material. As noted above, in some embodiments the fuel electrode 130 may be formed from permeable metal screens (i.e. the permeable electrode bodies 130a-e), which may be configured to capture, retain, and provide a growth platform for the metal fuel. Likewise, in some embodiments the separate charging electrode 140 may be of a similar configuration to one of the permeable electrode bodies 130a-e. In other embodiments, the charging electrode 140 may be of another configuration, which may be configured to create a potential difference with the fuel electrode 130 so as to encourage fuel growth on the fuel electrode during charging of the electrochemical cell 100. As discussed in greater detail below, the charging electrode 140 may be configured to evolve bubbles of gaseous oxygen during the charging process, which may rise upwards in the cell 100 due to their buoyancy in the ionically conductive medium, which may drive the convective flow of the ionically conductive medium.

Like the fuel electrode 130 and the charging electrode 140, the oxidant reduction electrode 150 may too be of any appropriate construction or configuration. For example, the oxidant reduction electrode 150 may generally be configured to provide for oxygen reduction in the electrochemical cell 100, to create a potential difference with the fuel electrode 130 during discharge of the cell 100. In an embodiment, the oxidant reduction electrode 150 may contain an active layer having meshes or coatings which may be characterized as "active material(s)," that facilitate the electrochemical reactions. Accordingly, in an embodiment, the oxidant reduction electrode 150 is positioned in the cell housing 110 such that the active materials contact the ionically conductive medium such that ions may be conducted therethrough, to and/or from the fuel electrode 130. In some embodiments, the active materials may be formed by a mixture of catalyst particles or materials, conductive matrix and hydrophobic materials, sintered to form a composite material or otherwise layered together. In various embodiments the active materials may be constructed of one or more metals, such as but not limited to those listed above. In some embodiments, the active materials may include a catalyst film, which in various embodiments may be formed by techniques including but not limited to thermal spray, plasma spray, electrodeposition, or any other particle coating method.

Electrically coupled to the active materials may be a current collector, which may be configured to receive electrons from a load for consumption by the oxidant reduction reaction when the cell 100 is in a discharge mode. Likewise, the current collector may be configured to collect electrons from the oxidation reaction at the active materials (i.e. if the oxidant reduction electrode 150 serves as the charging electrode) for delivery to the power supply PS, to participate in the electrochemical reactions at the active materials, when the cell 100 is in a charging mode. The current collector may be of any appropriate construction or configuration, including but not limited to being a metal screen, which may have gaps therein. In various embodiments the current collector may be constructed of metals or alloys such as but not limited to those described above for the active layer.

Additionally included in the oxidant reduction electrode 150 may be one or more hydrophobic materials, which may be any materials that are generally gas permeable but liquid impermeable, so as to contain the ionically conductive medium within the cell housing 110, or otherwise maintain an air space associated with the oxidant reduction electrode 150 (i.e. in the oxidant reduction electrode module 160). Although hydrophobic may in some contexts be understood as "water phobic" it should be appreciated that as used herein, hydrophobic implies that it resists permeation of or repels the ionically conductive medium as a whole, and not necessarily just the water in the ionically conductive medium. As such, the hydrophobic materials may also be considered hygrophobic, or "liquid phobic," materials. The oxidant reduction electrode 150 as a whole may therefore be liquid impermeable, yet permeable to a gaseous oxidant, such that the gaseous oxidant may contact the active materials of the oxidant reduction electrode 150, so as to serve as the oxidant during the electrochemical reactions taking place during discharge of the cell 100. In various embodiments, the hydrophobic materials may be of any suitable construction or configuration that facilitates supporting the active materials thereon, be generally permeable to the gaseous oxidant, and be generally impermeable to the ionically conductive medium.

In some embodiments, the hydrophobic material or materials serve as a backing material for the active materials and/or the current collector. Although the hydrophobic materials may vary across embodiments, in some embodiments the hydrophobic materials may be constructed of or otherwise include a fluoropolymer. As an example, in various embodiments, the hydrophobic materials may comprise polytetrafluoroethylene (also known as PTFE, or Teflon®), which may in some embodiments be thermo-mechanically expanded (also known as ePTFE, or Gore-Tex®). In other embodiments, the hydrophobic materials may comprise Fluorinated Ethylene Propylene (also known as FEP), a fluoropolymer, or any other hydrophobic binder (e.g. polypropylene and/or polyethylene). In some embodiments, the hydrophobic materials may have a fine pore size, such as but not limited to one on the order of less than 1 micrometer, or in more particular examples, may be on the order of approximately 50 to 200 nanometers. It may be appreciated that in some embodiments the hydrophobic materials may have limited tensile strength through the thickness of the oxidant reduction electrode 150. Accordingly, in some embodiments the hydrophobic materials may be reinforced by an oxidant-permeable reinforcing layer, such as that disclosed in U.S. Patent Application Publication No. 20130115525, entitled "External PTFE Layer Reinforcement for Oxidant Electrode," incorporated in its entirety by reference above.

In an embodiment, the fuel used in the cell 100 may be a metal, such as iron, zinc, aluminum, magnesium, manganese, cadmium, lead, germanium, sodium or lithium. By metal, this term is meant to encompass all elements regarded as metals or semi-metals on the periodic table, including but not limited to alkali metals, alkaline earth metals, lanthanides, actinides, post-transition and transition metals, either in atomic, molecular (including metal hydrides), or alloy form when collected on the electrode body. However, the present invention is not intended to be limited to any specific fuel, and others may be used. In an embodiment, the fuel may be provided to the cell 100 as particles suspended in the ionically conductive medium.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. In an embodiment, the ionically conductive medium may comprise an organic solvent, such as ethylene carbonate, dimethyl carbonate or other appropriate organic solvents, for example. In some embodiments, the ionically conductive medium is aqueous potassium hydroxide. In an embodiment, the ionically conductive medium may comprise an electrolyte. For example, a conventional liquid electrolyte solution may be used, or a room temperature ionic liquid may be used, as mentioned in U.S. Pat. No. 8,895,197, incorporated by reference in its entirety above. In some embodiments, additives may be added to the ionically conductive medium, including but not limited to additives that enhance the electrodeposition process of the metal fuel on the fuel electrode 130, such as is described in U.S. Pat. No. 8,877,391 and U.S. Patent Application Publication No. 20120321969, incorporated by reference in their entireties above. Such additives may reduce the loose dendritic growth of fuel particles, and thus the likelihood of such fuel particles separating from the fuel electrode 130, for example. In some embodiments, the ionically conductive medium may comprise any suitable separator or ion-exchange membrane, such as disclosed in the '969 Publication.

The operational relative humidity ranges may depend on the particular ionically conductive medium, in addition to the temperature of ambient air and the cell, for example. It may be appreciated that aqueous salt electrolytes, e.g., potassium hydroxide, may be characterized as hygroscopic. For example, for a cell comprising an aqueous KOH electrolyte, a relative humidity less than ca. 50% may result in water loss through the oxidant reduction electrode, or air electrode. An ambient relative humidity greater than 80% (or greater than ca. 80%) may result in water uptake into cell through the oxidant reduction electrode, or air electrode. Water release through the cathode may occur at greater relative humidities than ca. 50% in an air temperature range of 50 degrees Celsius to 80 degrees Celsius (for the cathode/oxidant reduction electrode module 160). A relative humidity from 50% (inclusive) to 80% (inclusive), or in a midrange, may be characterized as neutral. For example, at 70% relatively humidity into the cell, 250 ml of water may be lost at 50 degrees C., and only 15 ml (which is considered negligible in a cell having 8 liters total volume) is lost at 25 degrees C. It should be appreciated that the ranges may also and/or alternatively change depending on the ionically conductive medium and its hygroscopic/hygrophobic characteristics.

In operation of the cell 100, the fuel may be oxidized at the fuel electrode 130 when the fuel electrode 130 is operating as an anode, and an oxidizer, such as oxygen ($O_2$), $Cl_2$, or any other appropriate oxidizer, may be reduced at the oxidant reduction electrode 150 when the oxidant reduction electrode 150 is operating as a cathode, which is when the cell 100 is connected to a load and the cell 100 is in discharge or electricity generation mode, as discussed in further detail below. The reactions that occur during discharge mode may generate by-product precipitates, e.g., a reducible fuel species, in the ionically conductive medium. For example, in embodiments where the fuel is zinc, zinc oxide may be generated as a by-product precipitate/reducible fuel species. The oxidized zinc or other metal may also be supported by, oxidized with or solvated in the electrolyte solution, without forming a precipitate (e.g. zincate may be a dissolved reducible fuel species remaining in the fuel). During a recharge mode, which is discussed in further detail below, the reducible fuel species, e.g., zinc oxide or zincate ions, may be reversibly reduced and deposited as the fuel, e.g., zinc, onto at least a portion of the fuel electrode 130 that functions as a cathode. At the same time, either the oxidant reduction electrode 150 or the separate charging electrode 140, and/or another portion of the fuel electrode 130 functions as the anode, and oxidizes an oxidizable oxygen species (e.g., OH⁻ ions) in the ionically conductive medium to evolve gaseous oxygen. In an embodiment, the oxidizable oxygen species may be the reduced oxidant species that was created in the cell 100 during a discharge thereof.

Although in some embodiments the oxidizer may be delivered to the oxidant reduction electrode 150 by a passive system, which may be sufficient to allow diffusion or permeation of, e.g. oxygen from the air, into the oxidant reduction electrode 150, in other embodiments different sources of the oxidizer or mechanisms for bringing the oxidizer to the oxidant reduction electrode may be utilized. For example, in an embodiment, a pump such as an air pump AP may be used to deliver the oxidizer to the oxidant reduction electrode 150 under pressure. The air pump AP may be of any suitable construction or configuration, including but not limited to being a fan or other air movement device configured to produce a constant or pulsed flow of air or other oxidant. The oxidizer source may be a contained source of oxidizer. In an embodiment, oxygen may be recycled from the electrochemical cell module 100, such as is disclosed in U.S. Pat. No. 8,491,763, incorporated by reference in its entirety above. Likewise, when the oxidizer is oxygen from ambient air, the oxidizer source may be broadly regarded as the delivery mechanism, whether it is passive or active (e.g., pumps, blowers, etc.), by which the air is permitted to flow to the oxidant reduction electrode 150. Thus, the term "oxidizer source" is intended to encompass both contained oxidizers and/or arrangements for passively or actively delivering oxygen from ambient air to the oxidant reduction electrode 150.

In various embodiments, the permeable electrode bodies 130a-e, the separate charging electrode 140, and the oxidant reduction electrode 150 may be connected by a switching system that may be configured to connect the cell 100 to a power supply PS, a load, or other cells 100 in series. During discharge, the fuel electrode 130 is connected to the load, and operates as an anode so that electrons given off by the metal fuel, as the fuel is oxidized at the fuel electrode 130, flows to the external load. The oxidant reduction electrode 150 functions as the cathode during discharge, and is configured to receive electrons from the external load and reduce an oxidizer that contacts the oxidant reduction electrode 150, specifically oxygen in the air surrounding the cell 100, oxygen being fed into the cell 100, or oxygen recycled from the cell 100.

The operation of the switching system may vary across embodiments, and in some embodiments the operation may be similar to those described in '910 Patent, incorporated above by reference. As another example, in an embodiment, the external load may be coupled to some of the permeable electrode bodies 130a-130e in parallel, as described in detail in the '259 Patent, incorporated above by reference. In other embodiments, the external load may only be coupled to the terminal permeable electrode body 130a, distal from the oxidant reduction electrode 150, so that fuel consumption may occur in series from between each of the permeable electrode bodies 130a-130e. In some embodiments, the cell 100 may be configured for charge/discharge mode switching, as is described in the '197 Patent, filed on Sep. 17, 2010, previously incorporated by reference above.

In some embodiments, one or more of the electrode bodies 130a-e, the oxidant reduction electrode 150 and/or the charging electrode 140 may be interconnected by the switching system, or any other circuit, so as to selectively facilitate control of the charging and discharging of the cell 100. Switches associated with the switching system may be controlled by a controller, which may be of any suitable construction and configuration, including but not limited to, in some embodiments, conforming generally to those disclosed in the incorporated '910 and '207 Patents and '512 Publication. In various embodiments, the control of the switches of the switching system may be determined based on a user selection, a sensor reading, or by any other input. In some embodiments, the controller may also function to manage connectivity between the load and the power source PS and a plurality of the cells 100. In some embodiments, the controller may include appropriate logic or circuitry for actuating bypass switches associated with each cell 100 in response to detecting a voltage reaching a predetermined threshold (such as drop below a predetermined threshold).

As illustrated in FIG. 1, the ionically conductive medium may be filled to a level L within the cell chamber 120. As described in greater detail below, the level L of the ionically conductive medium may be altered in different modes, e.g., a water uptake mode or a humidification (or dehumidification) mode. As shown in FIG. 1, a water management system WMS may be coupled to the oxidant reduction electrode module 160 and may be configured to manage humidity levels within the air space 170, as well as recapture humidity as water, directing the water to the desiccator unit 122 and/or $CO_2$ scrubber, which may replenish the ionically conductive medium in the cell chamber 120. The water management system WMS is a feature of the present disclosure, and is described in greater detail below.

Although in the illustrated embodiment of FIG. 1 the cell housing 110 is configured such that the oxidant reduction electrode 150 is immersed with the oxidant reduction electrode module 160 into the cell chamber 120, it may be appreciated that in various embodiments, other configurations or arrangements of the cell 100 are also possible. For example, in FIG. 2, another embodiment of the cell 100 (specifically, cell 100*) is presented, whereby an oxidant reduction electrode 150* defines a boundary wall for the cell chamber 120, and is sealed to a portion of a housing 110* so as to prevent seepage of ionically conductive medium therebetween. Although such a configuration has concerns that a failure of the oxidant reduction electrode 150* would result in leakage of the ionically conductive medium out of the cell 100*, in some such embodiments a flow of the ionically conductive medium in the cell chamber 120 may be in a direction upwards and away from the oxidant reduction electrode 150*, across the top of the fuel electrode 130. Despite the downsides of electrochemical cells 100* having a boundary wall configuration of the oxidant reduction electrode 150*, it may be appreciated that such configurations of electrochemical cells 100* may exist, and may be retrofitted to engage the water management system WMS.

Figure 2:
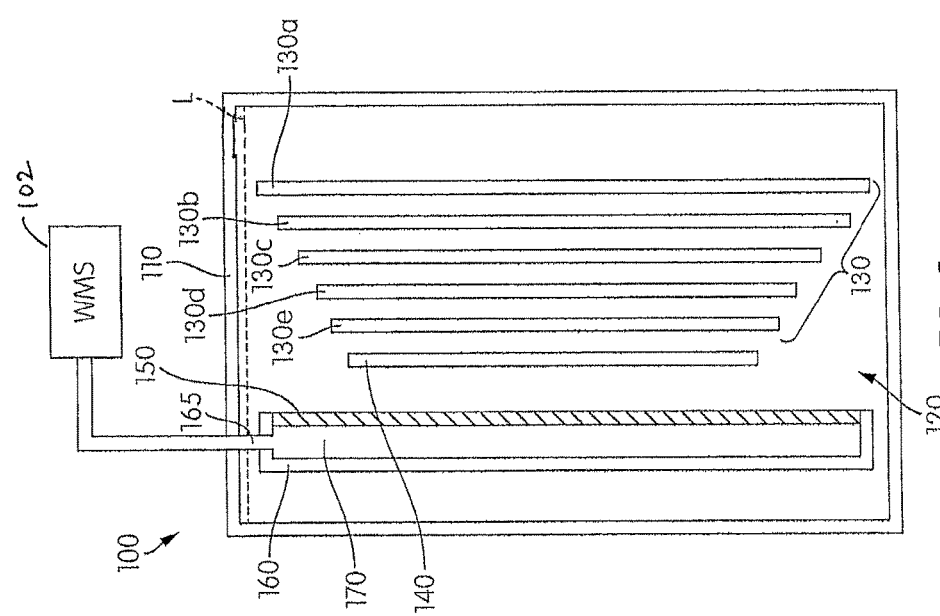
FIG. 2 schematically illustrates another embodiment of an electrochemical cell configured to be coupled to a water management system.

As shown in FIG. 2, in an embodiment such retrofitting of the electrochemical cell 100* may include surrounding the air facing side of the oxidant reduction electrode 150* by an external air chamber 190. While in the illustrated embodiment the external air chamber 190 is sealed to the cell housing 110*, in other embodiments the external air chamber 190 may be sealed to the oxidant reduction electrode 150*, or may be generally configured to generally surround the electrochemical cell 100*. Other configurations are also possible. It may further be appreciated that while the external air chamber 190 may be sealed to portions of the electrochemical cell 100* in some embodiments, in other embodiments the external air chamber 190 may more simply abut the electrochemical cell 100*, or more loosely be secured to the electrochemical cell 100*. In the illustrated embodiment, the external air chamber 190 forms an air space 170 between the oxidant reduction electrode 150* and the walls of the external air chamber 190. Similarly to the embodiment extending from the oxidant reduction electrode module 160 of FIG. 1, communication channels 165 may extend from the external air chamber 190, so as to form a path for air to flow between the air space 170 and the water management system WMS.

FIG. 3 schematically illustrates an embodiment of a water management system (WMS) 102 for managing water content in one or more electrochemical cells, such as those cells illustrated in FIGS. 1 and 2. FIG. 3 also generally illustrates a representation of the electrochemical cell 100. As shown, the cell housing 110 defines a cell chamber 120 that contains an amount of ionically conductive medium 145 (e.g., filled to the level L). The fuel electrode 130 and the separate charging electrode 140 (140 not being shown in FIG. 3, but which may be provided between fuel electrode 130 and oxidant reduction electrode module 160 in an embodiment, as understood by the prior description) are immersed in the ionically conductive medium. The oxidant reduction electrode 150 is also immersed in the ionically conductive medium 145, sealed to the oxidant reduction electrode module 160 to maintain the air space (170) therein. As shown in FIG. 3, the communication channels include a gaseous oxidant inlet 112 and a gaseous oxidant outlet 114 connecting through the gaseous oxidant receiving space 170, thereby allowing transport of gas into and out of the gaseous oxidant receiving space 170. As such, a flow of air comprising an oxidant may be received from an external source (e.g., ambient air, or a contained oxidant source), and may be fed into the air space/gaseous oxidant receiving space 170 through the inlet 112, before flowing out of the gaseous oxidant receiving space 170 via out of the outlet 114, as discussed in greater detail below. The oxidant reduction electrode 150 is configured to absorb the gaseous oxidant via the oxidant facing side and reduce the gaseous oxidant during a discharge mode of the electrochemical cell 100. While the inlet and the outlet are shown to be spaced differently relative to the oxidant reduction electrode 150 in the schematic view of FIG. 3, it may be appreciated that such an illustration may be simply to schematically show movement of the flow, and the inlet 112 and the outlet 114 may be aligned with one another in a plane parallel to that of the oxidant reduction electrode 150 in some embodiments.

The water management system 102 of FIG. 3 may be discussed in terms of the flows of air therein. As shown, an air inlet 142 may receive air from outside of the electrochemical cell 100 and the water management system 102. While in some embodiments as described herein the air may be from the ambient air in the atmosphere outside of the water management system 102, it is envisioned that, in other embodiments, the air may be from a contained oxidizer source (e.g., a tank of pure oxygen or an oxygen mix). In some embodiments, such as that illustrated where the air is from surrounding atmosphere, the air inlet 142 may include an air filter or other filtering structure configured to remove particulates or other contaminants from the air. Such a filter is optional, however, and may be absent in some embodiments. The inlet air from air inlet 142 may pass through a selectively closable valve 146, described in greater detail below. In an embodiment, the valve 146 may be located anywhere in the air flow path before the inlet 112. In addition, the valve 146 may be of any appropriate construction or configuration, and in some embodiments may comprise a check valve or a reed valve. The operation of some embodiments of the valve 146 (e.g., when it is selectively opened and closed) is discussed in greater detail below. As shown, the water management system 102 may include a fan 132 or other air flow generator positioned to generate a flow of the air from the air inlet 142 to the inlet 112 of the communication channels associated with the oxidant reduction electrode 150. In an embodiment, the valve 146 may be provided before the fan 132 in the air flow path.

Although hygrophobic coatings and other mechanisms may attempt to prevent the ionically conductive medium from permeating the oxidant reduction electrode 150, it may be appreciated that water (e.g. water vapor) from the ionically conductive medium may still slowly pass through the oxidant reduction electrode 150, increasing the humidity of the air in the air space 170. Not to be bound by any particular theory, but water may evaporate through the air electrode, electrolyte salt may be precipitated into the electrode thereby driving wetting of the electrode and/or leaks, and osmotic forces may cause water to permeate through from an ionically conductive medium contacting side of the oxidant reduction electrode 150 to an air side of the oxidant reduction electrode. These phenomena may occur more commonly when the relative humidity in the air space is low (i.e., approximately 10%).

Although the relative humidity of the air flow into the space 170 via inlet 112 may vary, in some embodiments, as previously described, the relative humidity of the humid gas-phase transported through gaseous oxidant inlet 112 into gaseous oxidant receiving space 170 may vary based on the electrolyte used, a temperature of ambient air (in), a relative humidity, and/or the cell temperature. Further, after traversing the air space 170, and increasing in humidity from the moisture content therein, the air flow may exit the oxidant reduction electrode module 160 via the outlet 114. Again, the relative humidity of the air flow beyond the outlet 114 may vary as well as the relative humidity leaving the air space 170, and may be altered based on varying conditions (such as those noted above). It may be appreciated that a fan such as fan 132 may further assist in transporting gas out of gaseous oxidant outlet 114.

The humid air exiting the air channel outlet 114 may pass through a selectively closable valve 148 either into the atmosphere as exhaust via air outlet 144 or into a desiccator unit 122 via outlet path 179, described in greater detail below. In an embodiment, the valve 148 may be located anywhere in the air flow path beyond the outlet 114, and in some embodiments the valve 148 may be located within the desiccator unit 122. In addition, the valve 148 may be of any appropriate construction or configuration, and in some embodiments may comprise a check valve or a reed valve, and may be simply configured to prevent undesired backflow. The operation of some embodiments of the valve 148 (e.g., when it is selectively opened and closed) is discussed in greater detail below. It may be appreciated that the valve 148 of the illustrated embodiment is merely exemplary, and a plurality of valves and paths that selectively couple the outlet 114 to either the desiccator unit 122 or the air outlet 144 may be utilized in other embodiments.

The desiccator unit 122 may also be of any appropriate construction or configuration, and is configured to selectively capture and release water from the humid air that has passed through the valve 148 and into the unit via outlet path 179. In some embodiments, the desiccator unit 122 comprises a chamber having a desiccant material therein, which is communicated to the gaseous oxidant inlet 112 and the gaseous oxidant outlet 114. While in an embodiment the desiccator unit 122 comprises silica gel, other hygroscopic substances may alternatively be utilized to absorb water from the humid air. For example, in some embodiments the desiccator unit 122 may comprise one or more of silica gel, activated charcoal, aluminum oxide, calcium sulfate, calcium chloride, montmorillonite clay and/or a molecular sieve. Other constructions or configurations that have exothermic water adsorption and endothermic water desorption properties may additionally or alternatively be utilized. Additionally, other mechanisms for isolating humidity from the air in the desiccator unit may alternatively be utilized. As one non-limiting example, the desiccator unit may comprise a solar still, shaped to condense and isolate water from the air therein. Also, in some embodiments a passively or actively cooled condensing unit could be employed. For example, active cooling could be accomplished by a Peltier/thermoelectric element. In embodiments where the desiccator unit 122 is configured to absorb and store the water from the humid air in a desiccant, it may be appreciated that the water may be selectively released by heating the desiccant. As such, in the illustrated embodiment, the desiccator unit 122 comprises a heater 124 which may be selectively activated to heat the desiccant via heating the desiccator unit 122 to selectively release extracted water from the desiccator unit 122. While the schematic view of FIG. 3 does not show how the heated and released water/steam might flow out of the desiccator unit 122, it may be appreciated a variety of configurations are possible across embodiments, which may allow water to enter an outflow path 155. For example, the desiccator unit 122 may be shaped with an angled wall or base leading to the outflow path 155. As another example, the heater 124 may be configured to heat the water sufficient to turn the water to steam, and direct the steam to the outflow path 155.

As shown in FIG. 3, a selectively closable valve 146 may be connected to the desiccator unit 122 via an inflow path 177. The valve 146 may be configured to selectively connect an inflow path 177 to the desiccator unit 122 or the air inlet 142 (to receive air from outside), to the inlet 112 of the electrochemical cell 100. In an embodiment, the valve 146 may be located anywhere in the air flow path before the inlet 112. In addition, the valve 146 may be of any appropriate construction or configuration, and in some embodiments may comprise a check valve or a reed valve, and may be simply configured to prevent undesired backflow. The operation of some embodiments of the valve 146 (e.g., when it is selectively opened and closed) is discussed in greater detail below. It may be appreciated that the valve 146 of the illustrated embodiment is merely exemplary, and a plurality of valves and paths that selectively couple the desiccator unit 122 to either air inlet 142 or inflow path 177 may be utilized in other embodiments.

It may be appreciated that the operation of the electrochemical cell 100 may modify operation of the water management system 102. Specifically, the water management system 102 may operate differently when the electrochemical cell 100 is in a discharge mode than when the electrochemical cell 100 is in a recharge mode. For example, in an embodiment when the electrochemical cell 100 is configured for discharging, a potential difference may be formed between the fuel electrode 130 and the oxidant electrode 150, such that the metal fuel on the fuel electrode 130 is being oxidized, while an oxidant (e.g., the oxygen in the air being received in the air inlet 142) is being reduced at the oxidant reduction electrode 150. When the electrochemical cell 100 is in a recharge mode, oxygen ions may be oxidized to evolve gaseous oxygen to the separate charging electrode 140 and/or a portion of the fuel electrode 130, while fuel ions may be reduced at least at another portion of the fuel electrode 130, to plate metal fuel on at least that other portion of the fuel electrode 130. Alternatively, the water management system 102 may be configured to operate in a mode despite the mode of operation of the electrochemical cell 100.

Additional examples of modes and conditions for operating electrochemical cells are further described below with reference to the disclosed embodiments as well as other operation scenarios.

In an embodiment, the water management system 102 is in a cell humidification mode. The heater 124 is actuated (or turned on) to provide moisture to the air that is being input into the electrochemical cell 100 by endothermic desorption of water from the desiccant material. The desiccator unit 122 receives input ambient air through outside or atmospheric inlet 175, so that it releases water vapor into the input air, and this humid air travels through inflow path 177 through valve 146 which is open to inlet 112 (and closed to receipt of ambient air via air inlet 142). As such, the system 102 is configured to release water vapor in desiccator unit 122 (via actuation of heater 124) to produce a humid gas-phase transported through gaseous oxidant inlet 112 into the gaseous oxidant receiving space 170 of the cell 100, whereby the water content of electrochemical cell 100 is managed by supplying a gas phase with a controlled humidity to oxidant reduction electrode 150 via gaseous oxidant receiving space 170. In an embodiment, as humidity is being transferred into the air flow passing through the air space 170, the valve 148 may be open so that the air flow exiting the air channel outlet 114 may be opened to the atmosphere via the path to the air outlet 144. The fan 132 may optionally be used to move the flow of air.

The above described humidification mode may occur simultaneously during discharge mode of the electrochemical cell 100, a cell charge or recharge mode, a cell idle mode, or a combination thereof.

Alternatively, the system 102 may be configured to capture water vapor at the desiccator unit 122 from a humid gas-phase exiting electrochemical cell 100 through gaseous oxidant outlet 114 in a water capture mode. For example, in such a mode, ambient air may be received through valve 146 which is open to atmosphere (and closed to receipt of air from desiccator unit 122). As air is directed into inlet 112 and the flow passes through the air space 170, the valve 148 may be open (closed off to the atmosphere) so that the air flow exiting the air channel outlet 114 may enter the desiccator unit 122. In some embodiments, it may be appreciated that the outflow path 155 is open to the air outlet, so that as the humidity is being absorbed from the humid air in the desiccator unit 122, the dried air may vent to the atmosphere. The desiccator unit 122 may therefore absorb moisture originally from the ionically conductive medium that would otherwise escape to the atmosphere through the oxidant reduction electrode 150, causing evaporation, and thus increased concentration, of the ionically conductive medium. The humid exhaust leaving the electrochemical cell 100 is captured by the desiccant media in the desiccator unit 122 to keep humidity in the system (as opposed to directly exhausting to ambient air via outflow path 155, which over time, may drop the water content in the ionically conductive medium). The fan 132 may optionally be used to move the flow of air therethrough. The system 102 thus still releases water vapor in desiccator unit 122 (the unit 122 uptakes moisture) from the exhaust stream of the electrochemical cell 100.

In an embodiment, the system 102 is configured to capture water vapor at the desiccator unit 122 as noted above simultaneously during cell discharge.

In an embodiment, e.g., when the electrochemical cell 100 is idle or off and in a recharge mode, the heater 124 and fan 132 may both be on to move water into the cell. Valve 146 may be open and the heater 124 may be heating the desiccator unit 122 to release water therefrom. Accordingly, during the heating by the heater 124, the selector valve 148 may be closed to the desiccator unit 122 and open to the atmosphere (and the air outlet 144). As such, the heated water may be directed through the inlet 112, condensing on the surface of the ionically conductive medium, or otherwise recombining with the ionically conductive medium. The moisture absorbed in the desiccator unit 122 may be released back into the ionically conductive medium of the cell 100, and the heater 124 may be deactivated when such is detected.

In an embodiment, valve 146 may be closed to the air inlet 112 (as the oxidant reduction electrode 150 may be idle), and open to direct ambient air from air inlet 142 through inflow path 177 and into the desiccator unit 122, so that the desiccator unit 122 captures water vapor therein. The heater 124 may optionally be heating the desiccator unit 122 to release water therefrom, and exhaust to the atmosphere via outflow path 155. It may be appreciated that by closing the valve 146, water from the desiccator unit 122 may be prevented from being released (e.g., as steam) to the air inlet 112.

Accordingly, as opposed to conventional battery watering systems, liquid water is not fed back into the cell directly, but rather water is added to the electrochemical cell 100 via a humid gas phase that contacts the air electrode.

In some embodiments, multiple electrochemical cells may share a common water management system. It may be appreciated that such a water management system may be configured so as to ensure that each of the electrochemical cells associated therewith maintain desired amounts of ionically conductive medium therein. It may also be appreciated that additional electrochemical cells 100 may be utilized in other embodiments. Further, other electrochemical cells (e.g., electrochemical cells 100*) may additionally or alternatively be utilized in other embodiments.

In addition, it is envisioned that in some embodiments the disclosed system may include a carbon dioxide (CO2) scrubber. In an embodiment, the carbon dioxide scrubber is provided subsequent to the desiccator unit and in advance of the gaseous oxidant inlet of the cell. As illustrated and described with reference to the exemplary embodiments of FIGS. 4 and 5 below, the carbon dioxide (CO2) scrubber is designed to absorb carbon dioxide (CO2) from the air that is input (e.g., via inflow path) into the desiccator unit and/or air inlet before it is directed to the inlet of the cell using a carbon dioxide scrubber medium or media. In an embodiment, the carbon dioxide scrubber is provided in series with the desiccator unit and in advance of the gaseous oxidant inlet (see FIG. 4). In an embodiment, the carbon dioxide scrubber is provided in parallel with the desiccator unit and in advance of the gaseous oxidant inlet (see FIG. 5).

When carbon dioxide ($CO_2$) is brought into contact with the electrolyte, e.g., from regular air containing ca. 400 ppm CO2, the result is the formation of carbonates. The formation and presence of carbonates in the electrolyte may decrease the voltage of the cells, and eventually causes low cycle life and/or failure. For example, $CO_2$ can react with potassium hydroxide (KOH) electrolyte to form potassium carbonate ($K_2CO_3$) according to equation 1, $$2KOH + CO_2 = K_2CO_3 + H_2O \quad (1)$$

Carbonate, e.g., $K_2CO_3$ can gradually build up in the alkaline electrolyte, reducing the conductivity and alkalinity of the KOH, thereby resulting in poor cell polarization characteristics. Furthermore, carbonates can deposit carbonate crystals in air electrode pores, thereby blocking oxygen transport, and causing leaks and shortening the lifetime of air electrodes. Thus, it may be appreciated by those skilled in the art that some advantages for providing a CO2 scrubber in advance of the gaseous oxidant inlet (e.g., 112) of the cell include greater cell voltages, longer cell cycle life, and greater efficiency.

In an embodiment, the carbon dioxide scrubber of FIG. 4 or FIG. 5 utilizes a carbon dioxide scrubber media or material(s) selected from the group of: soda lime, sodium hydroxide, potassium hydroxide, and lithium hydroxide, lithium peroxide, calcium oxide, calcium carbonate, serpentinite, magnesium silicate, magnesium hydroxide, olivine, molecular sieves, amines, and monoethanolamine, and/or derivatives and/or combinations thereof.

The CO2 scrubber media in the carbon dioxide (CO2) scrubber may be selected to have a greater CO2 capture efficiency with higher water content. Accordingly, integrating the carbon dioxide (CO2) scrubber with the desiccator unit allows for both an increase in efficiency of the CO2 capture media, as well as the option of 'pre-wetting' of the CO2 capture media (i.e., before a cell discharge), so that the air stream fed into a discharging electrochemical cell (100) has both low CO2 concentration and high humidity.

Referring now to the exemplary illustrations, FIG. 4 is a diagram of a water management system 200, in accordance with one embodiment, including a plurality of electrochemical cells 202a, 202b, and 202c with a desiccator unit 220 and CO2 Scrubber 240 connected in series. The number of cells illustrated in FIG. 4 is exemplary only and not intended to be limiting. It should be understood that each of the electrochemical cells 202a, 202b, and 202c include features previously noted above, such as with respect to FIGS. 1 and 2. For example, each electrochemical cell 202a-202c may include an ionically conductive medium 145 and an oxidant reduction electrode 150 having one surface facing the ionically conductive medium 145 and an opposite surface facing a gaseous oxidant receiving space 170. Each cell 202a, 202b, 202c may further include a gaseous oxidant inlet 210a, 210b, and 210c, respectively, for receiving air including an oxidant and a gaseous oxidant outlet 212a, 212b, and 212c, respectively, connecting through the gaseous oxidant receiving space 170, thereby allowing transport of gas into and out of the gaseous oxidant receiving space 170. An oxidant is allowed into the gaseous oxidant receiving space 170 via the gaseous oxidant inlets 210a, 210b, and 210c and out of the gaseous oxidant receiving space via the gaseous oxidant outlets 212a, 212b, and 212c. The oxidant reduction electrode 150 associated with each cell 202a-202c is configured to absorb the gaseous oxidant via the oxidant facing side and reduce the gaseous oxidant during a discharge mode of the electrochemical cell, for example.

In the water management system 200 of FIG. 4, ambient air enters the desiccator unit 220 from the atmosphere via an input, such as an inlet channel 202, and valve 224. Optionally, a fan 204 may be provided to pull and push air into the desiccator unit 220. The air is directed from the desiccator unit 220 via input channel 206 to the CO2 scrubber 240 that is connected in series to the desiccator unit 220. From the CO2 scrubber 240, the air is output via to the inlets 210a, 210b, and 210c of each of the cells 202a, 202b, and 202c.

Although the relative humidity of the air flow into the space 170 via inlets 210a, 210b, and 210c may vary, in some embodiments, the relative humidity of the humid gas-phase transported through gaseous oxidant inlets 210a, 210b, and 210c into gaseous oxidant receiving space 170 is greater than 50%.

In an embodiment, a fan 230a, 230b, and 230c is associated with each cell 202a, 202b, and 202c (respectively) in the system 200. Each fan 230a, 230b, and 230c, when activated, induces or creates a flow of air with oxidant into gaseous oxidant receiving space 170 through the gaseous oxidant inlets 210a, 210b, and 210c, thereby facilitating management of water content of each cell individually. After traversing the air space 170 in each cell 202a, 202b, and 202c, and increasing in humidity from the moisture content therein (or removing water content when it is desirable to lower the electrolyte level, for example, when the air breathing cell is operating in a humid region), the air flow may exit the oxidant reduction electrode module 160 associated with each cell 202a, 202b, and 202c via the outlets 212a, 212b, and 212c. Again, the relative humidity of the air flow beyond the outlets 212a, 212b, and 212c may vary, for example, depending on the mode of operation. In some embodiments, the relative humidity leaving the air space 170 may be greater than the input; in other embodiments, the relative humidity leaving the air space 170 may be less than the humidity of the air that is input. It may be appreciated that the fans 230a, 230b, and 230c may further assist in transporting gas out of gaseous oxidant outlets 212a, 212b, and 212c. Alternatively, in another embodiment, a fan for the entire cell block or system can be provided for transporting gas into gaseous oxidant inlets 210a, 210b, and 210c (and out of gaseous oxidant outlets 212a, 212b, and 212c).

The humid air exiting the air channel outlets 212a, 212b, and 212c may pass through a selectively closable valve 218, for example, either into the atmosphere as exhaust via air outlet 216 or into a desiccator unit 220 via outlet path 214. In an embodiment, the output air flows may recombine at an exit air manifold (not shown) of the water management system 200 before being exhausted through air outlet 216.

In embodiments where the desiccator unit 220 is configured to absorb and store the water from the humid air in a desiccant, it may be appreciated that the water may be selectively released by heating the desiccant. As such, in the illustrated embodiment, the desiccator unit 220 has a heater 225 associated therewith which may be selectively activated to heat the desiccant via heating the desiccator unit 220 to selectively release extracted water from the desiccator unit 220.

In an embodiment, the desiccant unit is bypassed on input, but uptakes moisture from the humid gas phase exiting the cells. This may be performed when a relative humidity of the ambient air is less than ca. 50% and the electrolyte level is high, so that water is removed from the cell(s). With reference to FIG. 4, then, ambient air is input via inlet channel 202 into CO2 scrubber 240 via input channel 207 and valve 224. From the CO2 scrubber 240, the air is output via the inlets 210a, 210b, and 210c of each of the cells 202a, 202b, and 202c. Fan 230a, 230b, and 230c may induce or create a flow of air with oxidant into gaseous oxidant receiving space 170 through the gaseous oxidant inlets 210a, 210b, and 210c, thereby facilitating management of water content of each cell individually. After traversing the air space 170 in each cell 202a, 202b, and 202c, and increasing in humidity from the moisture content therein, the air flow may exit the oxidant reduction electrode module 160 associated with each cell 202a, 202b, and 202c via the outlets 212a, 212b, and 212c. It may be appreciated that the fans 230a, 230b, and 230c may further assist in transporting gas out of gaseous oxidant outlets 212a, 212b, and 212c. The air may be directed to the desiccator unit 220. In one embodiment, the air may be exhausted from the desiccator unit 220 via outlet 216.

In another embodiment, the air may be transported in its humid phase as input via input channel 206 into the CO2 scrubber 240, e.g., for the uptake of water. In such a case, it may be understood that the cell may not be operating in a discharge mode, since the humid phase would mix with inlet air going into the cell, which may lower the overall oxygen going into the cell.

In the illustrated embodiment of the water management system 200 in FIG. 4, separate flow paths extend from the CO2 scrubber 240, which are not meant to be limiting. That is, the CO2 scrubber 240 may include one output that directs air to an air manifold (not shown), which then redirects air to inlets 210a, 210b, and 210c of the cells 202a, 202b, and 202c.

It may be appreciated that a plurality of valves and paths that selectively couple the inlets and outlets and paths to or from the desiccator unit 220, CO2 scrubber 240, and/or the air outlets 216, 222 may be utilized in other embodiments.

FIG. 5 is a diagram of a water management system 300, in accordance with another embodiment, including a plurality of electrochemical cells 302a and 302b with desiccator unit 320 and CO2 Scrubber 340 connected in parallel. The number of cells illustrated in FIG. 5 is exemplary only and not intended to be limiting. For example, each electrochemical cell 302a, 302b may include an ionically conductive medium 145 and an oxidant reduction electrode 150 having one surface facing the ionically conductive medium 145 and an opposite surface facing a gaseous oxidant receiving space 170. Each cell 302a, 302b may further include a gaseous oxidant inlet 310a, 310b, respectively, for receiving air including an oxidant and a gaseous oxidant outlet 312a, 312b, respectively, connecting through the gaseous oxidant receiving space 170, thereby allowing transport of gas into and out of the gaseous oxidant receiving space 170. The oxidant reduction electrode 150 associated with each cell 302a, 302b is configured to absorb the gaseous oxidant via the oxidant facing side and reduce the gaseous oxidant during a discharge mode of the electrochemical cell, for example.

In the water management system 300 of FIG. 5, the carbon dioxide scrubber 340 is provided in parallel with the desiccator unit 320 and in advance of the gaseous oxidant inlets 310a, 310b of the cells 302a, 302b. Ambient air enters the system 300 via an input, such as inlet channel 330. Optionally, a fan 332 may be provided to pull and push air either into the desiccator unit 320 or the CO2 scrubber 340. For example, a three-way valve V1 may be provided to direct ambient air either to the desiccator unit or the CO2 scrubber 340, or both, from the inlet channel 330. The air is directed from the desiccator unit 320 or the CO2 scrubber 340 to the inlets 310a, 310b of each of the cells 302a, 302b. A three way valve V2 is provided and controlled to allow the humid gas-phase air from the desiccator unit 320 to be input into the inlets 310a, 310b as well as to the carbon dioxide scrubber 340 via an open conduit. By releasing water vapor in desiccator unit 320 (via actuation of heater 322, noted below) to produce a humid gas-phase communicated to the carbon dioxide scrubber 340, "pre-wetting" of the carbon dioxide scrubber 340 occurs. In an embodiment, the humid gas-phase is communicated from the desiccator unit 320 to the carbon dioxide scrubber 340 via an open conduit (open valve V2).

In an embodiment, shown in FIG. 5, a liquid water reservoir 360 may optionally be provided as part of water management system 300. The liquid water reservoir 360 may be connected to the CO scrubber 340 and desiccator unit 320. In an embodiment, the liquid water reservoir 360 is configured to collect water exiting the desiccator unit 320 for delivery (by drip or otherwise) to the carbon dioxide scrubber 340. For example, this process may be performed during system idle or charge. On subsequent discharge, air is directed to the CO2 scrubber (by valve V1) where the relative humidity is increased due to evaporation of water absorbed/adsorbed on the CO2 scrubber media, thereby humidifying the air. The air is then directed by valve V2 into the cell inlets 310a and 310b. This allows the inlet air to be humidified during discharge without running the heater 322 (which would decrease system output power). Also, it allows the desiccator 320 to absorb moisture from the air leaving the cell during discharge.

Although the relative humidity of the air flow into the space 170 via inlets 310a, 310b may vary, in some embodiments, the relative humidity of the humid gas-phase transported through gaseous oxidant inlets 310a, 310b into gaseous oxidant receiving space 170 is greater than 50%.

In an embodiment, a fan 330a, 330b is associated with each cell 302a, 302b (respectively) in the system 300. Each fan 330a, 330b, when activated, induces or creates a flow of air with oxidant into gaseous oxidant receiving space 170 through the gaseous oxidant inlets 310a, 310b, thereby facilitating management of water content of each cell individually. After traversing the air space 170 in each cell 302a, 302b, and increasing in humidity from the moisture content therein, the air flow may exit the oxidant reduction electrode module 160 associated with each cell 302a, 302b via the outlets 312a, 312b. Although the relative humidity of the air flow beyond the outlets 312a, 312b may vary, in some embodiments, the relative humidity leaving the air space 170 may be approximately 70%. Of course, as previously noted, after traversing the air space 170, and increasing in humidity from the moisture content therein, the air flow may exit the oxidant reduction electrode module via the outlets. Again, the relative humidity of the air flow beyond the outlets 312a, 312b may vary as well as the relative humidity leaving the air space 170, and may be altered based on varying conditions (such as those noted above). It may be appreciated that the fans 330a, 330b may further assist in transporting gas out of gaseous oxidant outlets 312a, 312b. Alternatively, in another embodiment, a fan for the entire cell block or system can be provided for transporting gas into gaseous oxidant inlets 310a, 310b (and out of gaseous oxidant outlets 312a, 312b).

The remainder of the humid air exiting the air channel outlets 312a, 312b may pass through a selectively closable valve V3 either into the atmosphere as exhaust via air outlet 344 or into a desiccator unit 320 via outlet path 379, described in greater detail below. In an embodiment, the valve V3 may be located anywhere in the air flow path beyond the outlets 312a, 312b, and in some embodiments the valve V3 may be located within the desiccator unit 320. In addition, the valve V3 may be of any appropriate construction or configuration, and in some embodiments may comprise a check valve or a reed valve, and may be simply configured to prevent undesired backflow. The operation of some embodiments of the valve V3 (e.g., when it is selectively opened and closed) is discussed in greater detail below. It may be appreciated that the valve V3 of the illustrated embodiment is merely exemplary, and a plurality of valves and paths that selectively couple the outlets 312a, 312b to either the desiccator unit 320 or the air outlet 344 may be utilized in other embodiments.

In embodiments where the desiccator unit 320 is configured to absorb and store the water from the humid air in a desiccant, it may be appreciated that the water may be selectively released by heating the desiccant. As such, in the illustrated embodiment, the desiccator unit 320 has a heater 322 associated therewith which may be selectively activated to heat the desiccant via heating the desiccator unit 320 to selectively release extracted water from the desiccator unit 320. For example, the heater 322 may be configured to heat the desiccant material sufficient to turn the absorbed water to steam, and direct the steam to the outflow path 335, thereby bypassing the cells 302a, 302b to uptake moisture into the desiccator unit 320. In an embodiment, a fraction of humid gas phase exiting the desiccator unit 320 is directed to humidify cell 302a, 302b.

It may be appreciated that a variety of configurations are possible across embodiments, which may allow "pre-wetting" of the carbon dioxide scrubber 340, for example. In an embodiment, the humid gas-phase is communicated from the desiccator unit 320 to the carbon dioxide scrubber 340 via an open conduit, e.g., via open valve V2. In another embodiment, the humid gas-phase is communicated to the carbon dioxide scrubber 340 via a liquid water reservoir 360. The liquid water reservoir 360 is configured to collect water exiting desiccator unit 320 (e.g., through steam via heating from the heater 322; by drip or otherwise) for delivery to the carbon dioxide scrubber 340.

It may be appreciated that the operation of the electrochemical cells 302a, 302b may modify operation of the water management system 300. Specifically, the water management system 300 may operate differently when the electrochemical cells 302a, 302b are in a discharge mode than when the electrochemical cells 302a, 302b are in a recharge mode. Alternatively, the water management system 300 may be configured to operate in a mode despite the mode of operation of the electrochemical cells 302a, 302b.

In an embodiment, the water management system 300 is in a cell humidification mode. The heater 322 is actuated (or turned on) to humidify air that is being input into the electrochemical cell 100 to move water into the cell. More specifically, the desiccator unit 122 receives input air through inlet channel 330 (and fan 332), since the valve V1 is turned on to the desiccator unit 320 and closed off to the CO2 scrubber 340. Accordingly, water vapor is released into the air, and this humid gas-phase air is communicated through valve V2 which is open to inlets 310a, 310b of the cells 302a, 302b. In some embodiments, this humid gas-phase air is communicated through valve V2 to inlets 310a, 310b of the cells 302a, 302b as well as the carbon dioxide scrubber 340 via an open conduit. As such, the system 300 is configured to release water vapor in desiccator unit 320 (via actuation of heater 322) to produce a humid gas-phase transported through gaseous oxidant inlets 310a, 310b into the gaseous oxidant receiving space 170 of the cells 302a, 302b, whereby the water content of electrochemical cells 302a, 302b is managed by supplying a humid gas phase to oxidant reduction electrode 150 via gaseous oxidant receiving space 170. In an embodiment, the fans 330a, 330b may optionally be used to move the flow of air into the cells 302a, 302b,a6

The above described humidification mode may occur simultaneously during discharge mode of the electrochemical cells 302a, 302b, a cell charge or recharge mode, a cell idle mode, or a combination thereof. In an embodiment, the scrubber humidification mode occurs when external grid power is available.

Alternatively, the system 300 may be configured to capture water vapor in a water capture mode at the desiccator unit 320 from a humid gas-phase air exiting electrochemical cells 302a, 302b 100 through gaseous oxidant outlets 312a, 312b, thereby capturing water vapor leaving electrochemical cell 302a, 302b. Ambient air is received through inlet channel 330 from atmosphere and directed to the CO2 scrubber 340 (and closed to the desiccator unit 320). As air is directed from the scrubber 340, into inlets 310a, 310b and the flow passes through the air space 170, the valve V3 may be open (closed off to the atmosphere or outlet 344) so that the air flow exiting the air channel outlets 312a, 312b may enter the desiccator unit 320. In some embodiments, it may be appreciated that the outflow path 355 is open to the air outlet, so that as the humidity is being absorbed from the humid air in the desiccator unit 320, the dried air may vent to the atmosphere. The desiccator unit 320 may therefore absorb moisture originally from the ionically conductive medium that would otherwise escape to the atmosphere through the oxidant reduction electrode 150, causing evaporation, and thus increased concentration, of the ionically conductive medium. The humid exhaust leaving the electrochemical cells 302a, 302b is captured by the desiccant media in the desiccator unit 320 to keep humidity in the system (as opposed to directly exhausting to ambient air via exhaust 355, which over time, may drop the water content in the ionically conductive medium). The fans 330a, 330b may optionally be used to move the flow of air therethrough. The system 300 thus still releases water vapor in desiccator unit 320 (the unit 320 uptakes moisture) from the exhaust stream of the electrochemical cells 302a, 302b.

Moreover, in an embodiment, the system 300 is also configured to release water vapor in desiccator unit 320 (via actuation of heater 322) to produce a humid gas-phase communicated to the carbon dioxide scrubber 340, thereby "pre-wetting" the carbon dioxide scrubber 340.

In another embodiment, during a cell discharge mode, the system 300 is configured to transport ambient oxidant through carbon dioxide scrubber 340 to the gaseous oxidant inlets 310a, 310b of electrochemical cells 302a, 302b, thereby facilitating management of humidity and carbon dioxide concentration the gaseous oxidant.

In an embodiment, the system 300 is configured to capture water vapor at the desiccator unit 320 as noted above simultaneously during a cell discharge mode (grid off).

Again, it should be appreciated that the operation of the electrochemical cell in any of the above modes as described with reference to FIGS. 3-5 may be selected to modify the operation of the associated water management system. The water management system may operate differently when the electrochemical cell is in a discharge mode than when in a recharge mode. Exemplary modes of operation that may be utilized in an electrochemical cell as disclosed herein are summarized in the charts below:

| With no CO2 Scrubber (e.g., see FIG. 3) | | | | | |
|---|---|---|---|---|---|
| Mode | Function | Air In | Air Out | Heater Mode | Cell state |
| 1 | Capture water lost | ambient (e.g. <50%) | to desiccator (e.g. >50%) | off | discharge |
| 2 | from cells Add water to cells | from desiccator or high RH ambient (e.g. >70%) | to ambient (e.g. <70%) | on | discharge (not preferable), Idle, charge |
| 3a | Remove water from cells | ambient (e.g. <50%) | to ambient or desiccator (e.g. >50%) | off | discharge |
| 3b | Remove water from cells | ambient (e.g. >50%) to desiccator (e.g. <50%) | to ambient (e.g. >50%) | off | discharge |

| With CO2 Scrubber (e.g., see FIG. 4 and/or FIG. 5) | | | | | |
|---|---|---|---|---|---|
| Mode | Function | Air In | Air Out | Heater Mode | Cell state |
| 1 | Capture water lost from cells/ CO2 scrubber | ambient (e.g. <50%) | to desiccator (e.g. >50%) | off | discharge |
| 2a | Add water to CO2 scrubber | desiccator to CO2 scrubber | to ambient (does not pass through cell) | on | idle/ charge |
| 2b | Add water to CO2 scrubber | ambient to desiccator | to CO2 scrubber to cell | on | discharge |
| 3a | Remove water from cells | ambient (e.g. <50%) | to ambient or desiccator (e.g. >50%) | off | discharge |
| 3b | Remove water from cells | ambient (e.g. >50%) to desiccator (e.g. <50%) | to ambient (e.g. >50%) | off | discharge |

In some embodiments, charging of the electrochemical cells may be configured to disengage the fans, while in other embodiments the fans may remain engaged to cycle the humid air. In some embodiments, the operation of the fans may be pulsed or otherwise intermittent, while in other embodiments the fans may operate continuously. Further, operation of the fans may be controlled through timing circuits, control logic associated with the electrochemical cells (or a man controller associated therewith), and/or through sensors associated with the water management system. Other configurations are also possible in other embodiments.

It may be appreciated that a plurality of valves and paths that selectively couple the inlets and outlets and paths to or from the desiccator unit 320, CO2 scrubber 340, and/or the air outlet 355 or inlet may be utilized in other embodiments. Also, although not illustratively shown in each of the embodiments, an air manifold may be provided in the water management system, e.g., for input and/or exhausted air to/from the electrochemical cell(s).

The self-leveling feature of the water management systems may be appreciated with reference to the electrochemical cell 100 illustrated in FIG. 1. As shown, a level L of ionically conductive medium in the electrochemical cell 100 is provided. It may be appreciated that in some embodiments, the electrochemical cells 100 may contain therein level sensors configured to ascertain a level of the ionically conductive medium. Control could be based on level sensors, ambient temperature, ambient relative humidity, relative humidity exiting the cell, or a combination thereof. The level sensors may be of any construction or configuration, including but not limited to a buoyancy/float sensor, an optical sensor, a thermal sensor, conductivity sensor or so on. In an embodiment, when the ionically conductive medium drops below a desired level or predetermined lower limit for one or more of the electrochemical cells, the system enters and operates in a dehumidification mode. That is, the heater 124 may be activated to release water from the desiccator unit 122. In other embodiments, refilling may be automatic, based on timer circuits or similar control mechanisms. In some embodiments, sensors associated with the desiccator unit 122 may determine when to activate the heater 124. For example, the level sensor may be coupled to the heater 124, and activate the heater to release captured water from the desiccator unit 122. As one non-limiting example, if a sensor determines that the desiccant is completely saturated, however a humidity level within the desiccator unit 122 rises (indicating that additional water is unable to be absorbed in the desiccant), the heater 124 may vaporize the water to attempt to replenish the cell chambers. When level L is greater than a predetermined upper limit, the system enters the water capture mode. Other configurations are also possible, and may vary across embodiments.

The structures, constructions, and configurations described herein are exemplary, and may be varied across embodiments. In some embodiments, the valves are passive, requiring no external control for operation. In some embodiments, active valves having an external means of actuation may be employed. For example, the valves utilized herein may be of any appropriate configuration, including but not limited to three-way valves, reed valves, bimetal snap check valves, or so on. The valves may be activated through any appropriate source, including but not limited to servos, electronic controllers, heat (e.g., from the heater, e.g., element 124) or pressure (e.g., from the air flow generated by the fan, e.g., element 132, or from pressure associated with the heated water vapor). Additionally, the manifolds, pipes, tubes, connections, or other air/water flow paths may be of any appropriate construction or configuration, including but not limited to metal, plastic, and/or rubber. Other components of the electrochemical cells (e.g., electrochemical cell 100) or the water management systems (e.g., water management system 300) may similarly be of varied constructions or configurations.

Also, although one exemplary embodiment noted the use of zinc as fuel (to generate zinc oxide), in accordance with embodiments, the disclosed system may be used with any type of battery cell (any type of alkaline battery and/or battery using an oxidant electrode/cathode) to manage water. For example, various types of electrochemical cells including, but not limited to, metal-air, Ni—Zn, Ni—Cd, lead-acid, Ag—Zn, and/or Ni-MH batteries may utilize the disclosed system to capture and release water vapor, as previously described. Depending upon the type of battery, transportation of gas may be through an oxidant reduction electrode or through another type of air permeable membrane (e.g., porous fluoropolymer, porous metal, porous ceramic, etc.).

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Thus, the present invention is intended to encompass all modifications, substitutions, alterations, and equivalents within the spirit and scope of the following appended claims.

What is claimed:

1. A system for managing water content in one or more electrochemical cells, each electrochemical cell comprising a plurality of electrodes and a liquid ionically conductive medium, the system comprising:
   a desiccator unit having an input connected to the one or more electrochemical cells, the desiccator unit being configured for extracting and capturing water from a humid gas-phase exiting from the one or more electrochemical cells;
   a heater for selectively heating the desiccator unit to selectively release captured water from the desiccator unit to provide an output humid gas-phase through an output; and
   a carbon dioxide scrubber configured to absorb carbon dioxide,
   wherein, during a water capture mode, the system is configured to extract and capture water at the desiccator unit from the humid gas-phase exiting from the one or more electrochemical cells; and, wherein, during a cell humidification mode, the system is configured to release at least a portion of the captured water in the desiccator unit, via actuation of the heater, to produce the output humid gas-phase that is transported into the one or more electrochemical cells; and
   wherein the desiccator unit and the carbon dioxide scrubber are also configured to be selectively coupled in a scrubber humidification mode to deliver at least part of the output humid gas-phase from the desiccator unit to the carbon dioxide scrubber.

2. The system of claim 1, wherein the water capture mode occurs simultaneously with a cell discharge mode.

3. The system of claim 1, wherein the cell humidification mode occurs simultaneously with a cell charge mode, cell idle mode, a cell discharge mode or a combination thereof.

4. The system of claim 1, further comprising a fan for transporting a flow of oxidant and/or the output humid-gas phase through each electrochemical cell.

5. The system of claim 1, further comprising a level sensor associated with the one or more electrochemical cells that senses a level of the ionically conductive medium such that when the level is below a predetermined lower limit, the one or more electrochemical cells enters the cell humidification mode.

6. The system of claim 1, further comprising a level sensor associated with the one or more electrochemical cells that senses a level of the ionically conductive medium such that when the level is greater than a predetermined upper limit, the one or more electrochemical cells enters the water capture mode.

7. The system of claim 1, further comprising a level sensor associated with the one or more electrochemical cells, wherein the level sensor is coupled to the heater, and wherein the level sensor activates the heater to release the captured water from the desiccator unit.

8. The system of claim 1, wherein each electrochemical cell comprises a gaseous oxidant inlet for receiving gaseous oxidant, and wherein during a cell discharge mode, the system is configured to transport ambient gaseous oxidant through the carbon dioxide scrubber to the gaseous oxidant inlet of each electrochemical cell, thereby facilitating management of humidity and carbon dioxide concentration of the gaseous oxidant.

9. The system according to claim 1, wherein the carbon dioxide scrubber comprises materials selected from the group of soda lime, sodium hydroxide, potassium hydroxide, and lithium hydroxide, lithium peroxide, calcium oxide, calcium carbonate, serpentinite, magnesium silicate, magnesium hydroxide, olivine, molecular sieves, amines, monoethanolamine, and combinations thereof.

10. The system of claim 1, wherein the plurality of electrodes of each electrochemical cell in the system comprises a fuel electrode and an oxidant reduction electrode, wherein each cell comprises a gaseous oxidant receiving space, wherein the oxidant reduction electrode of each cell has one surface facing the ionically conductive medium and an opposite surface facing the gaseous oxidant receiving space, and wherein each cell comprises a gaseous oxidant inlet and a gaseous oxidant outlet connecting through the gaseous oxidant receiving space, thereby allowing transport of gas into and out of the gaseous oxidant receiving space.

11. The system of claim 10, wherein the carbon dioxide scrubber is provided in parallel with the desiccator unit and in advance of the gaseous oxidant inlet.

12. The system of claim 10, further comprising a fan associated with each electrochemical cell for creating a flow of oxidant and/or the output humid-gas phase into the gaseous oxidant receiving space, thereby facilitating management of water content of each cell individually.

13. The system of claim 10, wherein the relative humidity of the humid gas-phase transported through the gaseous oxidant inlet into the gaseous oxidant receiving space is greater than 50%.

14. The system according to claim 10, wherein the output humid gas-phase transported into the one or more electrochemical cells is transported to the gaseous oxidant receiving space.

15. The system of claim 1, wherein during the scrubber humidification mode, the output humid gas-phase delivered to the carbon dioxide scrubber pre-wets the carbon dioxide scrubber.

16. The system according to claim 15, wherein the output humid gas-phase is communicated from the desiccator unit to the carbon dioxide scrubber via an open conduit.

17. The system according to claim 15, wherein the output humid gas-phase is communicated to the carbon dioxide scrubber via a liquid water reservoir, the liquid water reservoir configured to collect water exiting the desiccator unit for delivery to the carbon dioxide scrubber.

18. The system according to claim 15, wherein a fraction of the output humid gas phase exiting the desiccator unit is directed to humidify each electrochemical cell.

19. The system according to claim 15, wherein the scrubber humidification mode occurs during a cell idle mode.

20. The system according to claim 15, wherein the scrubber humidification mode occurs when external grid power is available.

21. The system according to claim 15, wherein the humid gas-phase exiting the one or more electrochemical cells is directed to the desiccator unit, thereby capturing the water leaving the one or more electrochemical cells via the humid gas-phase.

22. A system for managing water content in one or more electrochemical cells, each electrochemical cell comprising a plurality of electrodes and a liquid ionically conductive medium, the system comprising:
a desiccator unit having an inlet connected to each electrochemical cell and configured for capturing water from a humid gas-phase exiting each electrochemical cell;
a heater for selectively heating the desiccator unit to selectively release captured water from the desiccator unit to provide an output humid gas-phase; and
a carbon dioxide scrubber connected to an output of the desiccator unit and configured to absorb carbon dioxide of the output humid gas-phase,
wherein, during a water capture mode, the system is configured to capture water at the desiccator unit from the humid gas-phase exiting from each electrochemical cell;
wherein, during a cell humidification mode, the system is configured to release at least a portion of the captured water in the desiccator unit, via actuation of the heater, to produce the output humid gas-phase that is transported into one or more of the electrochemical cells, and
wherein during a scrubber humidification mode, the system is configured to release at least a portion of the captured water in the desiccator unit to produce the output humid gas-phase that is communicated to the carbon dioxide scrubber, thereby pre-wetting the carbon dioxide scrubber.

23. The system according to claim 22, wherein the output humid gas-phase is communicated from the desiccator unit to the carbon dioxide scrubber via an open conduit.

24. The system according to claim 22, wherein the output humid gas-phase is communicated to the carbon dioxide scrubber via a liquid water reservoir, the liquid water reservoir configured to collect water exiting the desiccator unit for delivery to the carbon dioxide scrubber.

25. The system according to claim 22, wherein a fraction of the output humid gas-phase exiting the desiccator unit is directed to humidify each electrochemical cell.

26. The system according to claim 22, wherein the scrubber humidification mode occurs during a cell idle mode.

27. The system according to claim 22, wherein the scrubber humidification mode occurs when external grid power is available.

28. The system according to claim 22, wherein the humid gas-phase exiting one or more of the electrochemical cells is directed to the desiccator unit, thereby capturing water leaving the one or more electrochemical cells via the humid gas-phase.

29. A system for managing water content in one or more electrochemical cells, each electrochemical cell comprising an input, a plurality of electrodes, a gaseous oxidant receiving space, and a liquid ionically conductive medium, wherein one of the plurality of electrodes is an oxidant reduction electrode having one surface facing the ionically conductive medium and an opposite surface facing the gaseous oxidant receiving space; the system comprising:
a desiccator unit having an input connected to the one or more electrochemical cells, the desiccator unit being configured for extracting and capturing water vapor from a humid gas-phase exiting from the one or more electrochemical cells;
a heater for selectively heating the desiccator unit to selectively release captured water vapor from the desiccator unit to provide an output humid gas-phase through an output; and
a carbon dioxide scrubber configured to absorb carbon dioxide,
wherein, during a water capture mode, the system is configured to extract and capture water vapor at the desiccator unit from the humid gas-phase exiting from the one or more electrochemical cells; and, wherein, during a cell humidification mode, the system is configured to release at least a portion of the captured water vapor in the desiccator unit, via actuation of the heater, to produce the output humid gas-phase that is transported into the one or more electrochemical cells;

wherein the desiccator unit and the carbon dioxide scrubber are configured to be selectively coupled in a scrubber humidification mode to deliver at least part of the output humid gas-phase from the desiccator unit to the carbon dioxide scrubber, and wherein the input of the one or more electrochemical cells is connected to the gaseous oxidant receiving space to convey water vapor uptake into each of the one or more electrochemical cells through the oxidant reduction electrode.

30. The system according to claim 29, wherein the carbon dioxide scrubber is provided in parallel with the desiccator unit and in advance of the input.

31. The system according to claim 29, further comprising a fan associated with each electrochemical cell for creating a flow of oxidant and/or the output humid-gas phase into the gaseous oxidant receiving space, thereby facilitating management of water content of each cell individually.

32. The system according to claim 29, wherein a fraction of the output humid gas-phase exiting the desiccator unit is directed to each electrochemical cell.

33. A method for managing water content in one or more electrochemical cells, each electrochemical cell comprising a plurality of electrodes and a liquid ionically conductive medium, the method using a desiccator unit having an input connected to the one or more electrochemical cells and a heater for selectively heating the desiccator unit and comprising:

receiving humid gas-phase-output from the one or more electrochemical cells in the input of a desiccator unit and (a) in a water capture mode, extracting and capturing water using the desiccator unit from the humid gas-phase exiting from the one or more electrochemical cells;

(b) in a cell humidification mode, selectively heating the desiccator unit using the heater to selectively release at least a portion of the captured water from the desiccator unit to provide output humid gas-phase for outputting from the desiccator unit through an output that is transported into the one or more electrochemical cells;

(c) in a scrubber humidification mode, selectively outputting the output humid gas-phase from the desiccator unit to a carbon dioxide scrubber that is selectively coupled to the desiccator unit to deliver at least part of the output humid gas-phase from the desiccator unit to the carbon dioxide scrubber;

and absorbing carbon dioxide from the output humid gas-phase received from the desiccator unit using the carbon dioxide scrubber; and directing the received humid gas-phase from the carbon dioxide scrubber to the ionically conductive medium of one or more of the electrochemical cells.

34. The method according to claim 33, wherein the one or more electrochemical cells have a fan associated therewith, and wherein the method further comprises:

using the fan for transporting a flow of oxidant through each electrochemical cell.

35. The method according to claim 33, further comprising:

selectively collecting water exiting the output of the desiccator unit using a liquid water reservoir, and selectively delivering water to the carbon dioxide scrubber via the liquid water reservoir.

* * * * *